March 18, 1958     O. C. CALKINS     2,827,005
FLUID FERTILIZER DISTRIBUTOR
Filed June 21, 1954     2 Sheets-Sheet 1
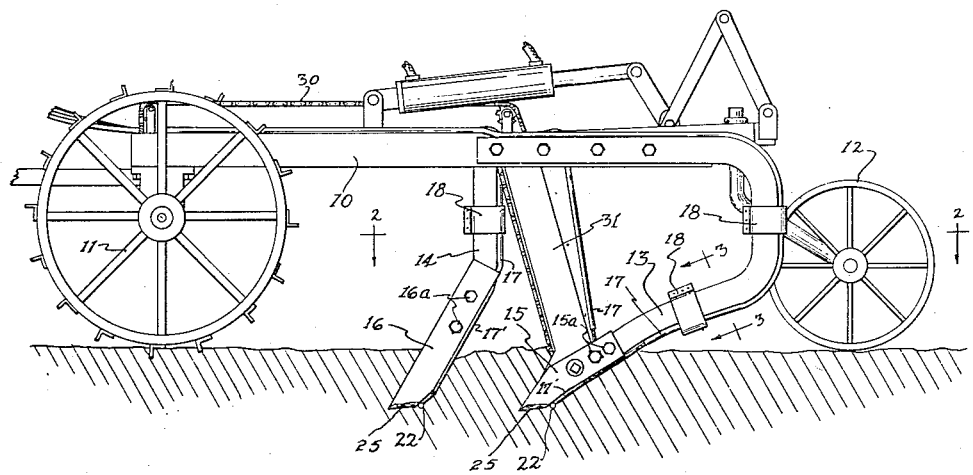
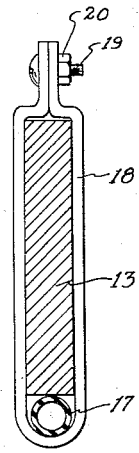
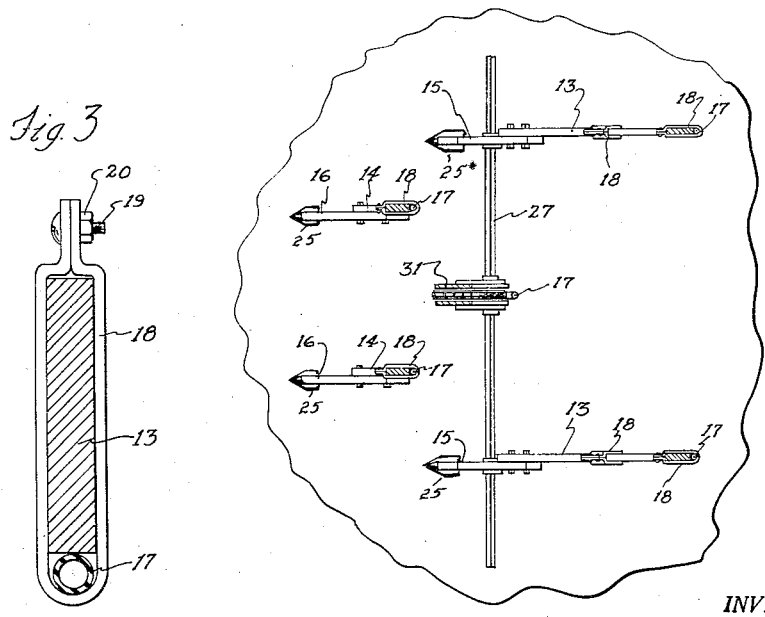
INVENTOR.
Oscar C. Calkins
BY
Atty.

March 18, 1958     O. C. CALKINS     2,827,005
FLUID FERTILIZER DISTRIBUTOR

Filed June 21, 1954     2 Sheets-Sheet 2

INVENTOR.
Oscar C. Calkins
BY Struhl Wells
Atty.

United States Patent Office 2,827,005
Patented Mar. 18, 1958

2,827,005

FLUID FERTILIZER DISTRIBUTOR

Oscar C. Calkins, Spokane, Wash., assignor to Calkins Manufacturing Company, Spokane, Wash.

Application June 21, 1954, Serial No. 438,035

3 Claims. (Cl. 111—7)

My invention relates to a combination fertilizer distributor. In the present practice of applying fluid fertilizers, it is common to use thin blades which extend into the soil at spaced intervals apart and to carry the fluid fertilizer down behind the blade to a small shoe which is provided at the lower end of the blade so as to discharge the fluid fertilizer into the soil at the rear end of the shoe. The soil will then close in behind the blade and thus entrap the fertilizer so that it will remain in the soil and be absorbed. In actual practice varying conditions of the soil result in substantial loss of fertilizer, particularly where the material applied is a gaseous fluid such as anhydrous ammonia. Various means have been proposed to overcome this difficulty but thus far they have not received general acceptaance.

It is the purpose of the present invention to provide in combination a fertilizer distributor utilizing the spaced blades which penetrate the soil with the fertilizer conducting tubes extending to the bottoms of the blades and behind the shoes, and a rotary bar extending between the blades and rotating in such a direction as to lift up and disturb the soil above and behind the point of discharge of the fertilizer, in order to insure adequate covering and sealing off of the area in the soil where the fertilizer is discharged. The advantages of this combination are two fold. The shoes and blades serve to keep the rotating rod at the proper elevation in the soil and to loosen the hard soil in advance of the rod so as to enable the rod to break up the soil more efficiently. The rotating rod also effectively breaks up the soil to a sufficient degree to close and seal off cracks that extend up to the soil surface, including those made by the bar traveling through the soil. The moisture in the soil is thus conserved, and the gaseous fertilizer cannot drift out to the surface before it has had time to be absorbed into the soil.

The nature and advantages of my invention will appear more fully from the following description and the accompanying drawings wherein a preferred form of the invention is shown. It should be understood, however, that the drawings and description are illustrative only and are not intended to limit the invention except insofar as it is limited by the claims.

In the drawings:

Figure 1 is a view in side elevation of a machine embodying my invention;

Figure 2 is a sectional view taken on the line 2—2 of Figure 1;

Figure 3 is an enlarged fragmentaray sectional view taken on the line 3—3 of Figure 1;

Figure 4:
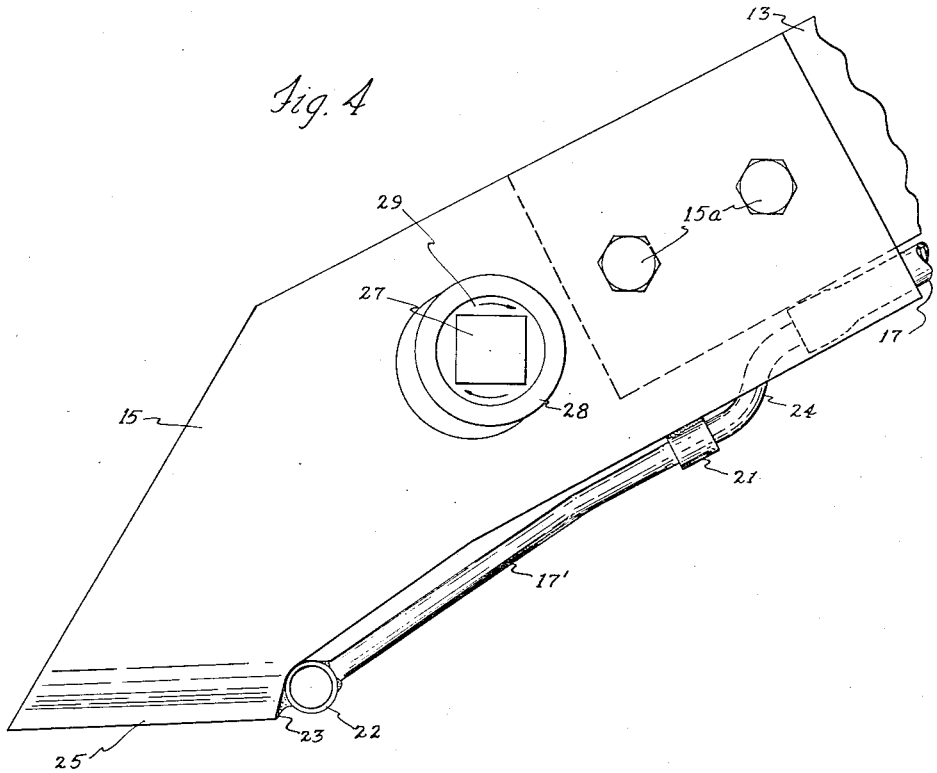
Figure 4 is a fragmentary side view on an enlarged scale of one of the fertilizer distributing members composed of a blade, a shoe at the lower end of the blade and a tube for delivering fertilizer to the rear end of the shoe.
Figure 5:
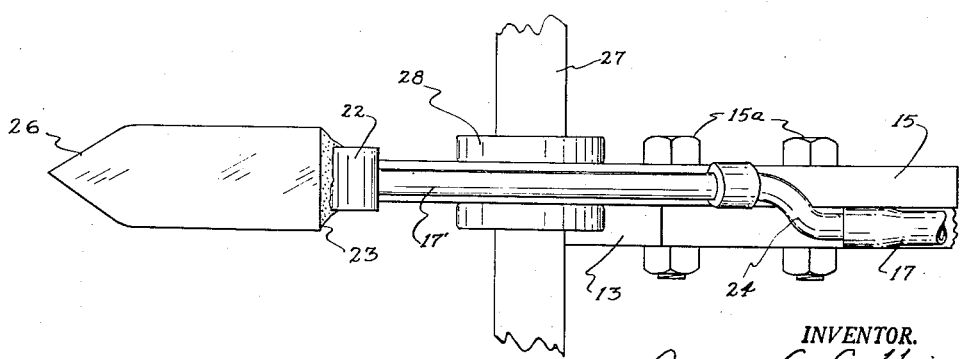
Figure 5 is a bottom plan view looking up at Figure 4.

Referring now in detail to the drawings, my invention is shown as embodied in a machine having a main frame 10 which is supported at the front by traction wheels 11 and at the rear by a caster wheel 12. The frame 10 carries a multiplicity of depending gooseneck bars 13 and additional bars 14 spaced in front of the bars 13 and staggered with respect to them. The bars 13 extend forwardly and downwardly and at their forward ends, they are provided with blades 15. The bars 14 also have distributor points 16 attached thereto and extending forwardly and downwardly into the soil. The blades 15 and 16 are removably secured by bolts 15a and 16a. I have shown each of the bars 13 and 14 and their blades 15 and 16 as having tubular conduits 17 extending along the back edges thereof from the rear lower corners of the blades 15 and 16 upwardly to the frame 10 and forwardly over the frame for connection to a tank, not shown, that contains the fertilizer fluid.

The main portions of the conduits 17 are rubber tubes which are secured in place along the bars 13 and 14 by metal bands 18 which are clamped to the bars by bolts 19 and nuts 20. The lower ends of the conduits 17 are small metal tubes 17' that are mounted along the back edges of the blades 15 and 16 by welding a ring 21 to each blade, as shown, to guide the tubes 17' and by welding a short tube 22 crosswise on the heel 23 of the distributor. The tube 17' opens into the tube 22 so that the fluid fertilizer discharged from the tube 17' flows out both ends of the tube 22. The upper end of the metal tube 17' is offset as indicated at 24 to line up with the mounting bar 13 or 14 to which the blade 15 or 16 is mounted. The blades 15 and 16 have laterally enlarged shoes 25 with tips 26 which may be of any known type, either integral with the blade, as shown, or separably mounted on the blade as known in such prior art devices as U. S. Letters Patent to Hannibal, No. 2,598,121, dated May 27, 1952, for Soil Injector.

The blades 15 and 16 as described will deliver the fluid fertilizer into the soil. I also provide means to seal the fertilizer in the soil and avoid the direct escape of gaseous fluid. I combine the blades with a device to work the soil at an intermediate level between the level of discharge of the fluid fertilizer into the soil and the soil surface. The blades 15 carry a rotatable square rod 27, each blade having a bearing shoe 28 therein which rotatably mounts a spool 29 through which the rod 27 extends.

The rod 27 is turned in the direction indicated by the arrows in Figure 4, by a driving connection to the wheel 11, as shown in Figure 1. The axle of the wheel 11 drives a chain 30 which extends to a center drive boot 31 that extends down around a sprocket on the rod 27. This drive mechanism is shown in U. S. Letters Patent to Claude C. Calkins, No. 2,506,577, dated May 9, 1950, for Rotary Rod Weeder. One of the conduits 17 is also provided at the rear of the boot 31.

The combination of the rotating rod 27 with the blades 15 and 16 results in the rod 27 being held in the ground below the surface due to the penetration of the blades well in advance of the rod. The forwardly and downwardly projecting blades break the soil crust in advance of the rod. Then when the rod passes through the soil at the intermediate level between the shoes 25 and the ground surface, it works the soil to lift coarse clods and weeds and to sift the particles of fine soil down to seal the fluid fertilizer in the bottoms of the channels made by the shoes 25 and the blades 15 and 16. Thus the fertilizer is sealed in below the level of working the soil and the rod is held in the soil, even in hard patches, because it cannot lift the points that are ahead of it in the soil.

It is believed that the nature and advantages of my invention will be apparent from the foregoing description.

Having described my invention, I claim:

1. A combination fertilizer distributor comprising a vehicle frame, a plurality of laterally spaced depending bars on said frame, forwardly and downwardly projecting blades having bottom ends spaced forwardly of the bars, said blades being carried by the bars, tubular conduits extending from the frame along the rear edges of said bars and blades to the rear of the bottom ends of the blades for discharging fluid fertilizer in the channel made by said blades as they are moved forwardly through the soil, a soil working rod journalled for rotation in said blades above and rearwardly of the outlet ends of said conduits, and means on the frame for rotating said rod.

2. A combination fertilizer distributor comprising a vehicle frame, a plurality of bars arranged in a row transversely of the frame and extending downwardly and forwardly, soil penetrating blades secured to the front ends of said bars, tubular conduits carried by said bars and blades to carry fluid fertilizer into the soil, a soil working rod carried by said bars and extending the length of said row, the rod being positioned by the bars to travel below the soil surface but above and spaced behind the outlet ends of said conduits, and means on the frame operably connected to the rod for rotating it.

3. A combination fertilizer distributor comprising a vehicle frame, a plurality of bars arranged in a row transversely of the frame and extending downwardly and forwardly, soil penetrating blades secured to the front ends of said bars, tubular conduits carried by said bars and blades to carry fluid fertilizer into the soil, a soil working rod carried by said bars above and behind the outlet ends of said conduits, a plurality of bars mounted on the frame in front of the said rod and being staggered with respect to the first named bars, said last named bars extending downwardly from the frame, soil penetrating blades at the lower ends of said last named bars, tubular conduits carried by said last named bars and blades to carry fluid fertilizer into the soil, and means on the frame operably connected to the rod for rotating it.

References Cited in the file of this patent
UNITED STATES PATENTS

| | | |
|---|---|---|
| 1,588,790 | Wolfe | June 15, 1926 |
| 2,125,359 | Scarlett | Aug. 2, 1938 |
| 2,528,270 | Fundingsland | Oct. 31, 1950 |
| 2,598,121 | Hannibal | May 27, 1952 |
| 2,619,054 | Bell | Nov. 25, 1952 |
| 2,628,546 | Kempling | Feb. 17, 1953 |
| 2,684,617 | Johnston | July 27, 1954 |
| 2,736,279 | Johnston | Feb. 28, 1956 |

FOREIGN PATENTS

| | | |
|---|---|---|
| 426,642 | Canada | Apr. 10, 1945 |